UNITED STATES PATENT OFFICE.

WILHELM EBHARDT, OF VIENNA, AUSTRIA-HUNGARY.

GUM-PENCIL.

1,055,454. Specification of Letters Patent. Patented Mar. 11, 1913.

No Drawing. Application filed March 9, 1910. Serial No. 548,220.

*To all whom it may concern:*

Be it known that I, WILHELM EBHARDT, a subject of the Emperor of Austria-Hungary, residing at Vienna, Austria-Hungary, have invented new and useful Improvements in Gum - Pencils, of which the following is a specification.

My invention relates to pencils, and a primary object is to provide a gum-pencil of the composition hereinafter claimed.

Gum-pencils of the kind to which my invention relates are particularly for gumming paper, and they consist of a dried adhesive substance brought into the form of a rod and of such composition that either only the part of the paper which is to be gummed is moistened and has passed over it the dry pencil, or the pencil is moistened and passed over the dry paper.

An adhesive substance suitable for manufacturing such a pencil consists of a mixture of gum, citric acid, chlorid of calcium and preferably potassium chromate. The latter accelerates the hardening of the mass, guarantees its holding together and causes the pencil to dry rapidly after the same has been moistened. After being mixed together the mentioned constituents are mixed with pure alcohol and the mass thus obtained is then pressed into the form of a rod or pencil and dried. The pencils thus obtained are cut, polished and wrapped in tin-foil.

The following may serve as an example of a particular composition suitable for use in my pencils: 70% best white Kordofan gum, 12% powdered gum arabic, 8% citric acid, 4% calcium chlorid, 6% potassium chromate.

Kordofan gum is a natural gum resulting from the drying of the exuded sap of the gum acacia trees found in Kordofan, Africa.

Such pencils may be carried in the pocket and are always ready for use.

I claim:—

1. As a new article of manufacture, a gum-pencil of the character described, the constituent substances of which are gum, citric acid and chlorid of calcium.

2. As a new article of manufacture, a gum-pencil of the character described, the constituent elements of which are gum, citric acid, chlorid of calcium and potassium chromate.

3. As a new article of manufacture a gum-pencil of the character described, the constituent elements of which are white Kordofan gum, gum arabic, citric acid, chlorid of calcium and potassium chromate.

WILLY EBHARDT.

Witnesses:
  PETER ERTZVOÏR,
  AUGUST FUGGER.